Dec. 4, 1962   J. W. FORREST   3,066,502
CONSTANT VELOCITY RATIO COUPLING FOR ROTATABLE SHAFTS
Filed March 1, 1961
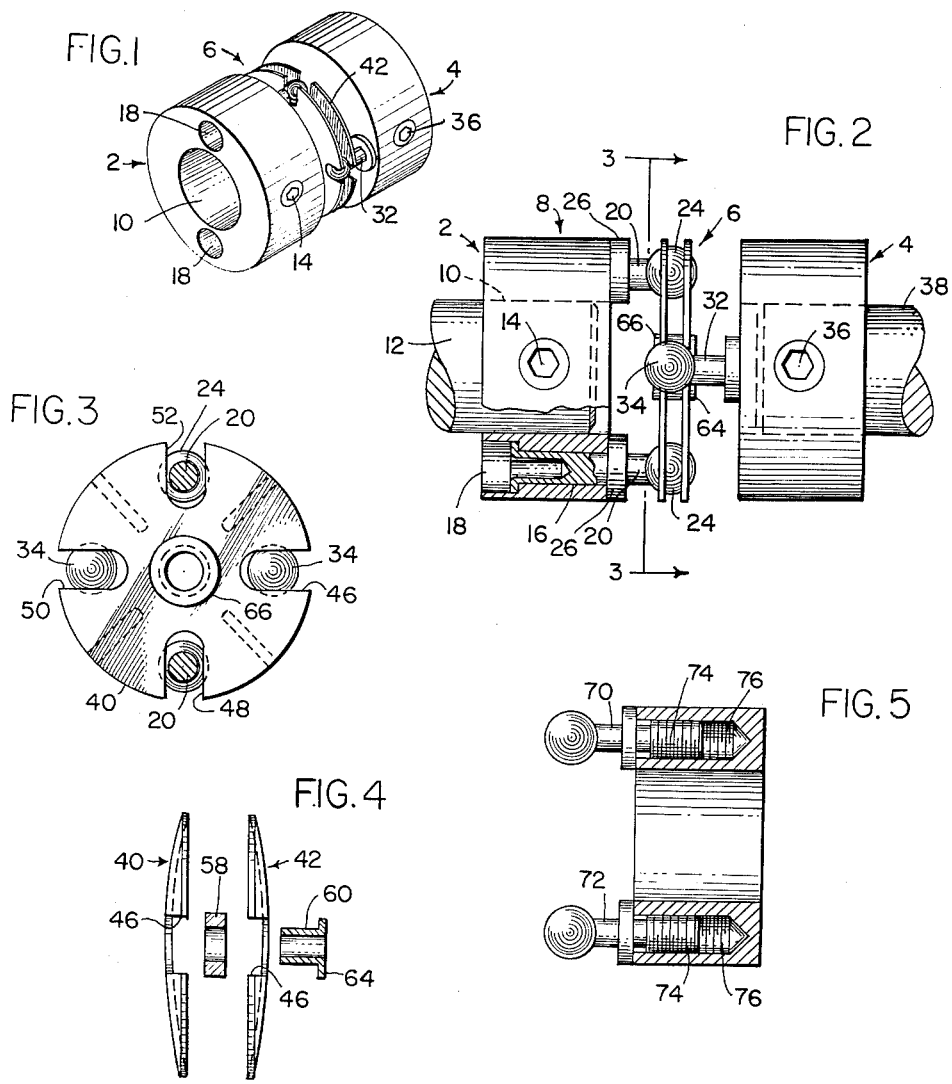
INVENTOR.
JOHN W. FORREST
BY
Weingarten, Osenbach & Pandiscio
ATTORNEYS

United States Patent Office 3,066,502
Patented Dec. 4, 1962

3,066,502
CONSTANT VELOCITY RATIO COUPLING FOR ROTATABLE SHAFTS
John W. Forrest, West Acton, Mass., assignor to Acton Laboratories, Inc., a corporation of Massachusetts
Filed Mar. 1, 1961, Ser. No. 92,526
7 Claims. (Cl. 64—15)

This invention relates to flexible shaft couplings and more particularly to a flexible shaft coupling which will transmit a uniform angular motion of unity between the shafts to which it is coupled.

The primary object of the present invention is to provide a new and improved flexible shaft coupling with a constant velocity ratio of unity which can be made in miniature sizes without sacrificing dependability, simplicity of construction, and precision.

A more specific object of the present invention is to provide a flexible shaft coupling which not only will transmit motion between coupled shafts at a uniform velocity ratio of unity but which will at the same time compensate for misalignment of the shafts to which it is connected, whereby it will transmit angular motion with the torsional rigidity and accuracy of a single shaft.

A further specific object of the present invention is to provide a flexible shaft coupling which comprises two hub units between which is interposed a floating spring element, the two hub units having ball pivots which are trapped by the intermediate floating spring element, as a result of which one hub unit may serve to drive the other hub unit notwithstanding lateral or axial misalignment of the two hub units.

Other objects and many of the attendant advantages of the present invention will become more readily apparent as reference is had to the following detailed specification when considered together with the accompanying drawings wherein:

FIG. 1 is a perspective view of a flexible shaft coupling embodying the present invention;

FIG. 2 is a side elevation of the same flexible coupling unit connected to two shafts, a portion of one hub unit shown in section;

FIG. 3 is a cross-sectional view taken along line 3—3 of FIG. 2;

FIG. 4 is an exploded view of the spring assembly of the same coupling; and

FIG. 5 is a longitudinal sectional view of a modified hub unit.

Referring now to FIGS. 1 and 2, the illustrated coupling unit consists of three pieces, namely, a hub assembly 2, a hub assembly 4, and a spring assembly 6. The two hub assemblies 2 and 4 are essentially identical. The hub assembly 2 comprises a cylindrical hub member 8 having an axial bore 10 which is sized to accommodate a shaft 12. Hub member 8 is provided with one or more radial bores which are tapped to receive suitable set screws 14 which function to clamp it to shaft 12. Set screws 14 may be of any suitable type, as, for example, socket head screws. The cylindrical hub member 8 is also provided with two diametrically opposed longitudinally extending bores 16 which are counterbored to form shoulders 18. Bores 16 are sized to accommodate identical pivot pins 20. These pins are provided with substantially spherical enlargements 24 at one end and flanges 26 intermediate their ends. Their other ends are hollow. The hollow ends of these pins may be peened or swaged over shoulders 18 as shown at 30 so as to secure them tightly within bores 16. The flanges 26 engage the end face of hub member 8 and thereby support the exposed portions of the pins against torsion as well as helping prevent them from moving axially.

The other hub assembly 4 is provided with identical pivot pins 32 whose spherical or ball ends are identified as 34. Like set screws 36 are used to secure it to a suitable shaft 38.

The floating spring assembly 6 is made up of two identical concave-convex spring washers 40 and 42 which are positioned with the concave sides facing each other. These washers have four radial slots 46, 48, 50, and 52 which are spaced 90 degrees apart. The width of these slots is larger than the minimum diameter of pins 20 and 32 but smaller than their enlarged rounded ends 24 and 34. Disposed between the two washers 40 and 42 is an annular spacer element 58. Also forming part of the spring assembly is an eyelet or hollow rivet 60 having a flange head 64 thereon. The two washers have central holes which are slightly larger than eyelet 60 but smaller than its flange head 64. The washers are riveted together, concave sides facing and slots aligned, with the spacer 58 interposed therebetween. This is achieved by inserting eyelet 60 through the central holes in the two washers and also the central hole in the spacer 58 and then swaging or peening its unflanged end to form a second flange 66. In fashioning the spring assembly, the convex portions of the two washers flatten out, thereby exerting a spring force on each other. This force is largest at the extremity of the radial slots 46, 48, 50, and 52 and decreases to substantially zero at the center of the washers where spacer 58 is located.

The pins 20 of hub assembly 2 are disposed in slots 48 and 52 with their ball pivots captivated between the two washers. The other ball pivots are disposed in slots 46 and 50 with their ball pivots captivated in the same manner between the two washers. The ball pivots are able to slide radially because of the slots. They are also able to pivot relative to the slots. However, because of the spring pressure exerted thereon by the washers 40 and 42, the ball pivots cannot rotate about the axis of the washers. In other words, there is no relative rotation or backlash between the two hub assemblies. As a result, when the hub assemblies 2 and 4 are mounted on two shafts such as shafts 12 and 38, one shaft can be used to drive the other with a constant velocity ratio of unity, regardless of any misalignment between the two shafts. In other words, the couplnig device of FIG. 1 will transmit angular motion with the torsional rigidity and accuracy of a single shaft.

It is to be observed that in the construction illustrated in FIGS. 1 to 4, the pivot pins may be positioned between the two spring washers before they are clamped together by the rivet 60. Alternatively, it is possible to insert them after the two spring washers have been clamped together. This is easily done due to the fact that the washers are resilient and will separate enough to allow a ball pivot to be snapped in place.

It is contemplated also that the pivot pins need not be permanently secured to the hub units. Thus, for example, as shown in FIG. 5, it is possible to provide ball pivots 70 and 72 which are threaded as at 74 so as to screw into tapped holes 76 formed in the hub members. This form of construction has the advantage of facilitating attachment and removal of the pivot pins from the hub element. Otherwise, however, it is essentially the same as the construction shown in FIG. 2.

Although it is preferred to have an all-metal construction, it is contemplated that plastic may be used in place of metal. It is also to be known that the sizes or shapes of the component elements may be varied according to end use requirements.

It is believed to be readily apparent that flexible couplings embodying the present invention are relatively simple. At the same time, however, they are relatively strong and are capable of transmitting angular motion between two independent component shafts with the torsional rigidity and accuracy of a single shaft, notwithstanding the fact that the two independent shafts may be misaligned. A further advantage of the foregoing construction is that it requires a limited number of different parts. Thus, for example, the two hub members and their associated pivot pins are identical, and the two spring washers are also identical. Another advantage of the construction in question is that it is easy to assemble and install. A further important advantage is the relatively low cost of manufacture, due in great measure to the fact that none of the elements require elaborate machining.

Obviously, many modifications and variations of the present invention are possible in the light of the above teachings. It is to be understood, therefore, that the invention is not limited in its application to the details of construction and arrangement of parts specifically described or illustrated, and that within the scope of the appended claims it may be practiced otherwise than as specifically described or illustrated.

I claim:

1. A flexible shaft coupling comprising first and second identical hub assemblies each comprising a hub member having a pair of ball pivots on one face thereof, said hub members disposed with said one faces adjacent to each other but with ther ball pivots angularly displaced, and a spring assembly comprising two slotted spring washers positioned between said two hub assemblies, said ball pivots captivated between said washers whereby one hub assembly is effective to transmit motion to the other hub assembly notwithstanding misalignment of said two hub assemblies.

2. A flexible shaft coupling comprising first and second identical hub assemblies each comprising a hub member having a pair of ball pivots on one face thereof, said hub members disposed with said one faces adjacent to each other but with their ball pivots angularly displaced, and a spring assembly positioned between said two hub assemblies, said spring assembly comprising two concave-convex spring washers with their concave sides facing each other, and means securing said washers together whereby they exert a spring force on each other which is largest at their periphery, said ball pivots being capivated between said two spring washers whereby one hub assembly is effective to transmit motion to the other hub assembly notwithstanding misalignment of said two hub assemblies.

3. A flexible shaft coupling as defined by claim 2 wherein said ball pivots are in the form of pins having enlarged substantially spherical portions.

4. A flexible shaft coupling as defined by claim 3 wherein said pins are permanently secured to said hub members.

5. A flexible shaft coupling as defined by claim 3 wherein said pins are screwed into said hub members.

6. A flexible shaft coupling comprising first and second identical hub assemblies each comprising a hub member having a pair of ball pivots on one face thereof, said hub members disposed with said one faces adjacent to each other but with their ball pivots angularly displaced, and a spring assembly positioned between said two hub assemblies, said spring assembly including a pair of concave-convex spring washers arranged with their concave sides facing each other, a spacer positioned between said washers at their centers, and a rivet securing together said spring washers and said spacer, said ball pivots being captivated between said spring washers whereby one hub assembly is effective to transmit motion to the other hub assembly notwithstanding misalignment of said two hub assemblies.

7. A flexible shaft coupling as defined by claim 6 wherein said washers have edge slots and said ball pivots are pins each having one end anchored in a hub member and another end in the form of a ball, said pins extending through said slots with said balls captivated between said washers.

References Cited in the file of this patent
UNITED STATES PATENTS

| | | |
|---|---|---|
| 1,643,017 | Hufferd | Sept. 20, 1927 |
| 2,014,309 | Brock | Sept. 10, 1935 |